(12) United States Patent
Zhu et al.

(10) Patent No.: US 9,548,841 B2
(45) Date of Patent: Jan. 17, 2017

(54) METHOD, SYSTEM FOR TRANSMITTING TRAFFIC DATA OVER A PAGING CHANNEL AND USER EQUIPMENT

(75) Inventors: Yun Zhu, Shenzhen (CN); Chun Huang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 7 days.

(21) Appl. No.: 14/119,674

(22) PCT Filed: Sep. 29, 2011

(86) PCT No.: PCT/CN2011/080352
§ 371 (c)(1),
(2), (4) Date: Nov. 22, 2013

(87) PCT Pub. No.: WO2012/159402
PCT Pub. Date: Nov. 29, 2012

(65) Prior Publication Data
US 2014/0086196 A1    Mar. 27, 2014

(30) Foreign Application Priority Data
May 24, 2011    (CN) .......................... 2011 1 0135433

(51) Int. Cl.
*H04W 4/00*    (2009.01)
*H04L 5/00*    (2006.01)
(Continued)

(52) U.S. Cl.
CPC ............. *H04L 5/003* (2013.01); *H04L 5/0053* (2013.01); *H04W 68/02* (2013.01); *H04W 76/046* (2013.01)

(58) Field of Classification Search
CPC ........... H04W 72/042; H04W 72/0413; H04W 88/08; H04L 5/0053; H04L 5/0055
USPC ................... 370/329; 455/450, 458
See application file for complete search history.

(56) References Cited

U.S. PATENT DOCUMENTS

| 2003/0157945 A1 | 8/2003 | Chen et al. |
| 2007/0060153 A1 | 3/2007 | Torsner et al. |

(Continued)

FOREIGN PATENT DOCUMENTS

| CN | 1918923 A | 2/2007 |
| CN | 101175302 A | 5/2008 |

(Continued)

OTHER PUBLICATIONS

Supplementary European Search Report in European application No. 11866371.5, mailed on Oct. 16, 2015.
(Continued)

*Primary Examiner* — Joshua Kading
*Assistant Examiner* — Atique Ahmed
(74) *Attorney, Agent, or Firm* — Oppendahl Patent Law Firm LLC (57) ABSTRACT

The disclosure provides a method for transmitting traffic data over a paging channel, comprising: determining, by a network side, that a user equipment (UE) has a capability of transmitting a paging channel (PCH) beared on a High Speed-Physical Downlink Shared Channel (HS-PDSCH); informing, by the network side, the UE of information of a traffic control information bearer channel through a paging identifier, when the UE is in a PCH state; listening, by the UE, for the traffic control information bearer channel; and receiving, by the UE, the traffic data on a traffic channel indicated by the traffic control information. The disclosure provides a system and a UE for transmitting traffic data over a paging channel. The solution in the disclosure allow the UE to be still able to transmit data with highspeed when in the PCH state, so as to avoid the complex process in the conventional art, to reduce signaling cost and traffic delay and to improve user experience.

13 Claims, 3 Drawing Sheets

(51) Int. Cl.
*H04W 68/02* (2009.01)
*H04W 76/04* (2009.01)

(56) References Cited

U.S. PATENT DOCUMENTS

| | | | |
|---|---|---|---|
| 2007/0259675 A1 | 11/2007 | Worrall | |
| 2008/0207229 A1* | 8/2008 | Cave | H04W 68/025 455/458 |
| 2009/0003208 A1* | 1/2009 | Payyappilly | H04W 76/045 370/230.1 |
| 2009/0052376 A1* | 2/2009 | Cave | H04W 68/02 370/328 |
| 2009/0245203 A1* | 10/2009 | Pani | H04W 36/30 370/331 |
| 2011/0092229 A1* | 4/2011 | Chang | H04L 1/0038 455/458 |
| 2011/0098053 A1* | 4/2011 | Widegren | H04W 8/26 455/450 |
| 2013/0040667 A1 | 2/2013 | Torsner et al. | |
| 2014/0141790 A1 | 5/2014 | Torsner et al. | |

FOREIGN PATENT DOCUMENTS

| | | |
|---|---|---|
| CN | 101400188 A | 4/2009 |
| CN | 101467477 A | 6/2009 |
| CN | 101489287 A | 7/2009 |
| CN | 101635961 A | 1/2010 |
| CN | 101641992 A | 2/2010 |
| CN | 101686527 A | 3/2010 |
| CN | 101945478 A | 1/2011 |
| WO | 2005079085 A1 | 8/2005 |

OTHER PUBLICATIONS

International Search Report in international application No. PCT/CN2011/080352, mailed on Mar. 1, 2012. (3 pages—see entire document).

English Translation of the Written Opinion of the International Search Authority in international application No. PCT/CN2011/080352, mailed on Mar. 1, 2012. (8 pages—see entire document).

<<3GPP TS 25.331 V10.3.1>>, Radio Resource Control (RRC)Protocol specification,3gpp,mailed on Apr. 11, 2011.

* cited by examiner

METHOD, SYSTEM FOR TRANSMITTING TRAFFIC DATA OVER A PAGING CHANNEL AND USER EQUIPMENT

TECHNICAL FIELD

The disclosure relates to Always on service transmission, and in particular to a method and a system for transmitting traffic data over a paging channel and a user equipment.

BACKGROUND

With development of wireless communications, the types of services become increasingly diverse. Services that can be provided are no longer restricted to conventional voice and short message services, new services are emerging, such as the email service, the private network service, the Always on service in which data is frequently transmitted and the amount of the data is small. The Always on service may be processed automatically in the background without user intervention, while data transmission has to be always kept. If such a service is accessed in a conventional way, i.e., a User Equipment (UE) is paged firstly, then the UE initiates a Radio Resource Control (RRC) connection to establish a dedicated wireless channel and transmits or receives user data on the Dedicated Channel (DCH), the user of the UE cannot enjoy the service of a high speed data transmission physical channel. If the Always on service is transferred from the DCH to the High-Speed Downlink Shared Channel (HS-DSCH) for transmission, the transmission process will be too complex due to added additional signaling overhead and additional service setup latency caused by interaction, and thus user experience is degraded.

Therefore, the 3rd Generation Partnership Project (3GPP) introduced a Forward Access Channel (FACH) technology into the Release8, so that the UE may access and transmit Always on traffic data at a high data rate in a CELL_FACH state. For example, the Chinese application published on May 7, 2008 with Publication No. CN101175302A and titled "Method and apparatus for always on service maintaining" discloses a method for realizing enhanced FACH in detail, i.e., to realize the Always on service using the FACH. However, in addition to the FACH, the Always on service may be realized using other means such as a Paging Channel (PCH).

The Chinese application published on Mar. 31, 2010 with Publication No. CN101686527A and titled "Method and apparatus for transmitting and receiving broadcast control channel" discloses a method for receiving and sending HS-DSCH transmission resources through PCH. However, this application only discloses interactions between a NodeB and a network side and is focused on the configuration for channels inside the NodeB, but does not relate to the information interaction between the UE and the NodeB, the UE, the NodeB and the network side.

In view of the above, there is no mature and effective technical solution which enables bearing of the HS-DSCH channel in the CELL_PCH state and transmission of the Always on service data.

SUMMARY

Accordingly, the disclosure provides a method, a system for transmitting traffic data over a paging channel and a UE, so as to widen application of the Always on service.

To this end, one aspect of the disclosure provides a method for transmitting traffic data over a paging channel, including: a network side determines that a user equipment (UE) has a capability of transmitting a paging channel (PCH) beared on a High Speed-Physical Downlink Shared Channel (HS-PDSCH); the network side informs the UE of information of a traffic control information bearer channel through a paging identifier, when the UE is in a PCH state; the UE listens for the traffic control information bearer channel; and the UE receives the traffic data on a traffic channel indicated by the traffic control information.

Preferably, the traffic control information bearer channel may be a High Speed Shared Control Channel (HS-SCCH) or a High Speed Shared Control Channel (PCCH), and the traffic channel may be a Broadcast Control Channel (BCCH).

Preferably, the BCCH may be beared on the PCH, and the PCH may be beared on a HS-DSCH.

Preferably, the network side informs the UE of information of the traffic control information bearer channel through the paging identifier, when the UE is in a CELL-PCH state or in a URA_PCH state.

Preferably, the method may include: before the UE is in the CELL-PCH state, the UE transmits a radio resource control (RRC) connection establishment request indicating that the UE has a capability of bearing the PCH on a highspeed physical channel, to a NodeB; the NodeB forwards the RRC connection establishment request with an Enhanced Dedicated Channel (E-DCH) Radio Network Temporary Identifier (E-RNTI) assigned to the UE to a network control network element;

the network control network element assigns a HS-DSCH Radio Network Transaction Identifier (H-RNTI) to the UE after receipt of the RRC connection establishment request;

the network control network element transmits a RRC connection establishment acknowledgement with the E-RNTI and the H-RNTI to the NodeB; the NodeB forwards the RRC connection establishment acknowledgement with the E-RNTI and the H-RNTI, to the UE;

the UE enters the CELL-PCH state.

Preferably, the listening, by the UE, for the traffic control information bearer channel, and receiving, by the UE, the traffic data on a traffic channel indicated by the traffic control information, which may include:

the UE listens for the HS-SCCH to perform synchronization according to a Paging Indicator Channel (PICH) identifier from the network side;

the network side triggers a cell system information update through the HS-SCCH;

the network side instructs the UE to receive the BCCH on the HS-SCCH;

the UE receives the traffic data from the BCCH.

Preferably, the listening, by the UE, for the traffic control information bearer channel, and receiving, by the UE, the traffic data on a traffic channel indicated by the traffic control information, which may include: the UE listens for the HS-SCCH according to a PICH identifier from the network side;

the UE synchronizes itself with the HS-SCCH through a UE identifier in the HS-SCCH;

the network side transmits the traffic data through the HS-DSCH when detecting up-link synchronization of the UE;

the UE receives the traffic data through the HS-DSCH.

Preferably, the method may include: before the UE is in the CELL-PCH state, the UE transmits a RRC connection establishment request indicating that the UE has a capability of bearing the PCH on a high speed physical channel, to a NodeB;

the UE directly enters the CELL-PCH state.

Preferably, the listening, by the UE, for the traffic control information bearer channel, and receiving, by the UE, the traffic data on a traffic channel indicated by the traffic control information, which may include:

the UE listens for the HS-SCCH according to a PICH identifier from the network side to perform synchronization;

the network side triggers a cell system information update through the HS-SCCH;

the network side instructs the UE to receive the BCCH on the HS-SCCH;

the UE receives the traffic data from the BCCH.

Another aspect of the disclosure provides system for transmitting traffic data over a paging channel I, which includes:

a network side configured to determine that a UE has a capability of transmitting a paging channel (PCH) beared on a High Speed-Physical Downlink Shared Channel (HS-PDSCH), and to inform the UE of information of a traffic control information bearer channel through a paging identifier when the UE is in a PCH state;

and the UE configured to listen for a traffic control information bearer channel and to receive the traffic data on a traffic channel indicated by the traffic control information.

Preferably, the traffic control information bearer channel may be a High Speed Shared Control Channel (HS-SCCH) or a High Speed Shared Control Channel (PCCH), and the traffic channel may be a Broadcast Control Channel (BCCH), the BCCH is beared on the PCH and the PCH is beared on a High Speed Downlink Shared Channel (HS-DSCH).

Preferably, the PCH state may include a CELL-PCH state and a URA_PCH state.

Preferably, when the UE is in the CELL-PCH state, the UE may be further configured to listen for the HS-SCCH to perform synchronization according to a Paging Indicator Channel (PICH) identifier from the network side;

the network side may be further configured to trigger a cell system information update through the HS-SCCH, so as to instruct the UE to receive the BCCH on the HS-DSCH;

the UE may be further configured to receive the traffic data from the BCCH.

Preferably, when the UE is in the CELL_PCH state, the UE may be further configured to listen for the HS-SCCH to perform synchronization according to a PICH identifier from the network side;

the network side may be further configured to trigger a cell system information update through the HS-SCCH, so as to instruct the UE to receive the BCCH on the HS-DSCH;

the UE may be further configured to receive the traffic data from the BCCH

Another aspect of the disclosure provides a user equipment (UE) having a capability of transmitting a paging channel (PCH) beared on a High Speed-Physical Downlink Shared Channel (HS-PDSCH), which may include:

a listening module configured to listen for a traffic control information bearer channel when the UE is in a PCH state;

a receiving module configured to receive traffic data on a traffic channel indicated by the traffic control information.

Preferably, the traffic control information bearer channel is a High Speed Shared Control Channel (HS-SCCH) or a High Speed Shared Control Channel (PCCH), and the traffic channel is a Broadcast Control Channel (BCCH), the BCCH is beared on the PCH and the PCH is beared on a High Speed Downlink Shared Channel (HS-DSCH).

Preferably, the PCH state comprises: a CELL-PCH state and a URA_PCH state.

In the disclosure, the PCH is beared on the HS-DSCH, and the Always on service is performed when the UE is in the PCH state, so that the UE is still able to transmit data at a high speed when in the PCH state, so as to avoid the complex service proceeding process in the related art, to reduce signaling overhead and traffic delay and to improve user experience.

DETAILED DESCRIPTION

To make objects, solutions and advantages of the disclosure clearer, the embodiments of the disclosure will be described in detail with reference to drawings.

Firstly, channels involved in the disclosure will be briefly described.

1) the PCH is a common downlink transmission channel. In the conventional art, the PCH is beared on the Secondary Common Control Physical Channel (SCCPCH). In the disclosure, the PCH is beared on the physical channel HS-DSCH with higher-speed data transmission, and the state where the UE is transmitting or receiving data on the PCH is referred to as a CELL_PCH state.

2) the HS-DSCH is a downlink physical channel. The HS-DSCH may be transmitted at high data rate since the data is transmitted with higher encoding rate and higher order modulation on the HS-DSCH.

3) the Broadcast Control Channel (BCCH) is a logical channel. The BCCH is beared on the PCH and is used to transmit the Always on service data.

First Embodiment

This embodiment relates that a UE receives a BCCH beared on a HS-DSCH under a CELL_PCH state.

Figure 1:
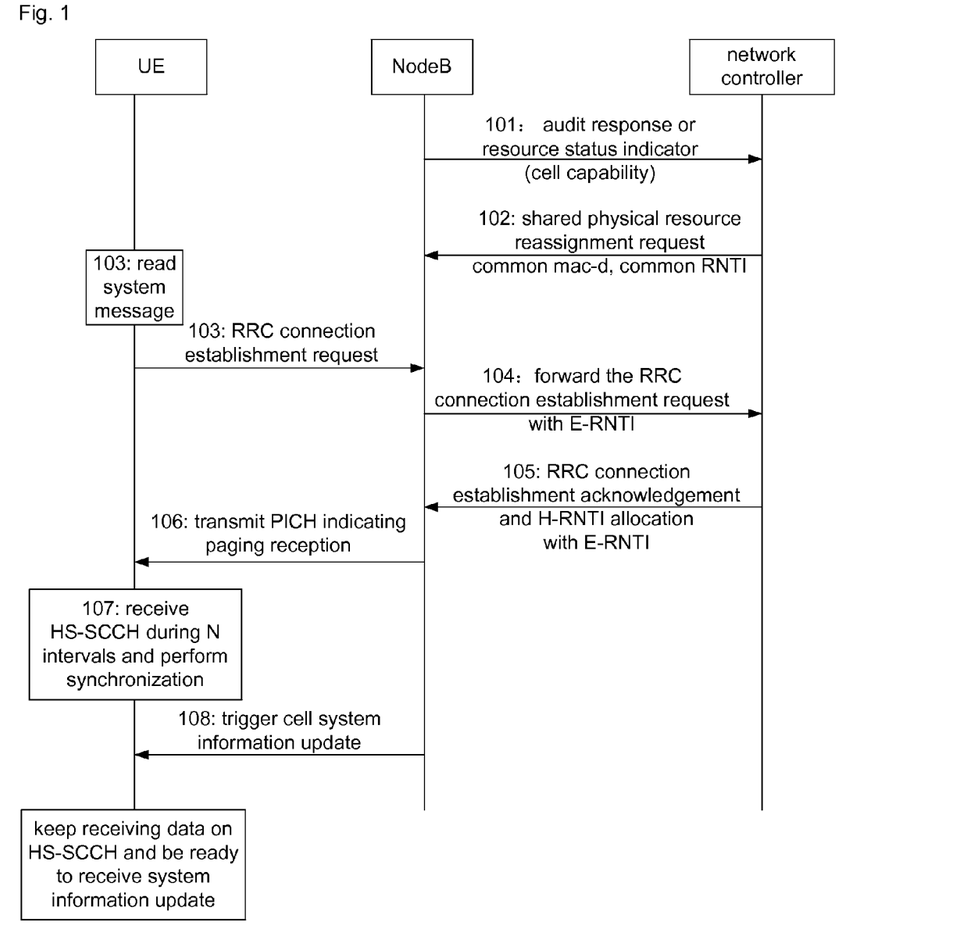
FIG. 1 is a flowchart of a method for transmitting traffic data over a paging channel according to a first embodiment of the disclosure.

FIG. 1 is a flowchart of the method for transmitting traffic data over a paging channel according to the first embodiment of the disclosure. As shown in FIG. 1, the method includes the following steps.

Step 101: a NodeB informs a network controller of a cell capability through an audit response or a resource status indicator.

Specifically, the resource audit response or the resource status indicator transmitted by the NodeB must include the following cell capacities, i.e., "Enhanced FACH Capability" and "Enhanced PCH Capability"; the above capabilities indicate that the NodeB has a capability of transmitting a high-data-rate PCH.

Step 102: the network controller assigns a common mac-d and a common Radio Network Temporary Identifier (RNTI) to the NodeB through a shared physical resource reassignment request.

The physical resource reassignment request is an instruction transmitted from the network controller to the NodeB. In the instruction, the network controller assigns a series of parameters for the HS-DSCH (HS-DSCH Common System Information LCR) to the NodeB. The above parameters include at least parameters for indicating wireless network temporary identifier, i.e., "BCCH Specific HS-DSCH RNTI Information LCR" and paging system information i.e., "HS-DSCH Paging System Information LCR" beared on the BCCH.

Step 103: a UE reads a system message and transmits a connection establishment request to the NodeB in the cell.

The fifth system information block (SIB5) in the system message includes a series of information assigned to the NodeB by the network controller in the step 2, the information at least includes "HS-DSCH common system information" and "HS-DSCH paging system information". The "HS-DSCH common system information" includes parameters such as "HS-SCCH system info", "Common H-RNTI Information", "BCCH specific H-RNTI" and the like.

The RRC connection establishment request transmitted by the UE includes a parameter "HS-PDSCH in CELL_FACH" indicating that the UE has a capability of transmitting the PCH beared on the highspeed physical channel. That is, the UE has a capability of receiving the PCH beared on the HS-DSCH.

Step 104: the NodeB transmits the RRC connection establishment request to the network controller through a Frame Protocol (FP).

The FP is a protocol for exchanging user plane information between the NodeB and the network controller, and carries an E-DCH Radio Network Temporary Identifier (E-RNTI) to be assigned to the UE by the NodeB.

Step 105: the network controller assigns corresponding HS-DSCH Radio Network Transaction Identifier (H-RNTI) to the UE after receipt of the connection establishment request, and forwards a RRC connection acknowledgement to the NodeB through the FP frame, in which the FP frame carries the H-RNTI and the E-RNTI assigned to the UE.

The NodeB transmits the assigned H-RNTI and E-RNTI and the RRC connection acknowledgement to UE after receipt of the FP frame.

The UE enters a CELL-PCH state after receipt of the RRC connection acknowledgement.

Step 106: the NodeB transmits a paging indicator via a Paging Indicator Channel (PICH) to instruct the UE to receive the paging.

Step 107: the UE receives a High Speed Shared Control Channel (HS-SCCH) in N time intervals and performs synchronizing process.

The time interval is preset in the network and is time necessary to make the UE accessed in the HS-SCCH.

Step 108: the NodeB triggers cell system information update and transmit HS-SCCH signals using the BCCH specific H-RNTI.

Specifically, a first HS-SCCH listed on the update message "HS-SCCH system info" transmitted by the NodeB uses the BCCH specific H-RNTI to instruct the UE to receive the BCCH on the HS-DSCH.

After receipt of the update message, the UE keeps receipt of data on the HS-SCCH and is ready to receive a system message update.

Hereinafter, the NodeB may transmit a RRC message "SYSTEM INFORMATION CHANGE INDICATION" via the HS-DSCH; while the UE may receive the system message update via the HS-DSCH.

Second Embodiment

This embodiment relates that a UE receives a Physical Control Channel (PCCH) on a HS-DSCH in a URA_PCH state, and obtains a notification instructing to perform modification on a BCCH.

Figure 2:
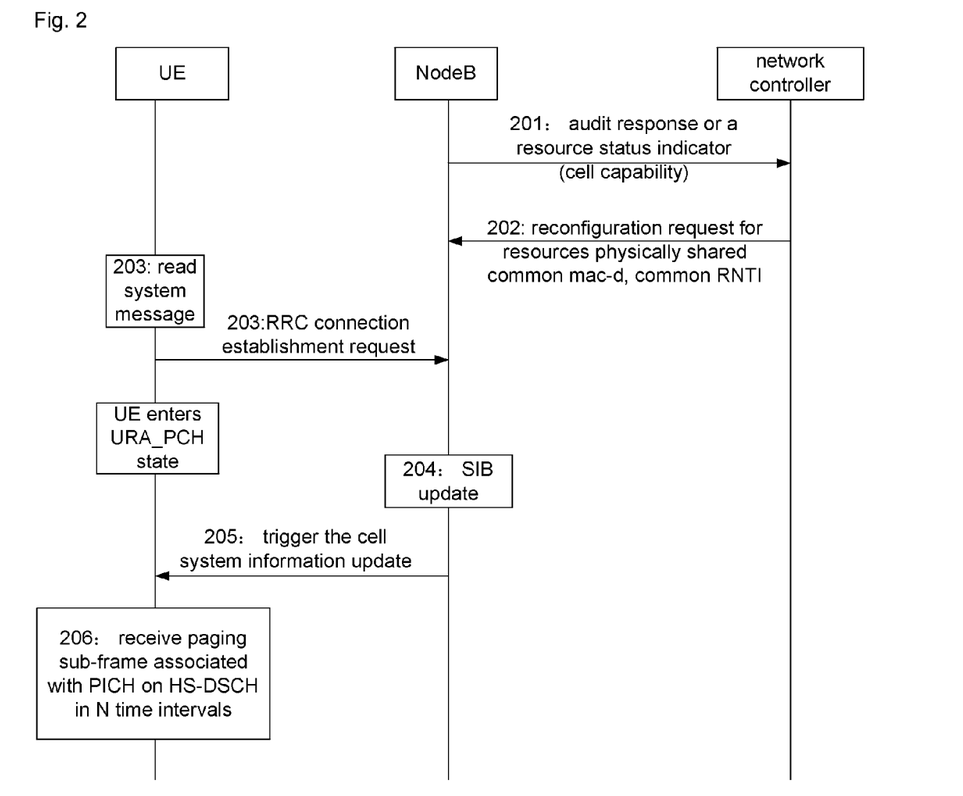
FIG. 2 is a flowchart of a method for transmitting traffic data over a paging channel according to a second embodiment of the disclosure.

FIG. 2 is a flowchart of a method for transmitting traffic data over a paging channel according to the second embodiment of the disclosure. As shown in FIG. 2, the method for transmitting traffic data over a paging channel according to this embodiment includes the following steps.

Step 201: a NodeB informs a network controller of a cell capability through an audit response or a resource status indicator.

Specifically, the resource audit response or the resource status indicator transmitted by the NodeB must include the following cell capacities, i.e., "Enhanced FACH Capability" and "Enhanced PCH Capability"; the above capabilities indicate that the NodeB has a capability of transmitting a high-data-rate PCH.

Step 202: the network controller assigns a common mac-d and a common Radio Network Temporary Identifier (RNTI) to the NodeB through a shared physical resource reassignment request.

The shared physical resource reassignment request is an instruction transmitted from the network controller to the NodeB. In the instruction, the network controller assigns a series of parameters for the HS-DSCH (HS-DSCH Common System Information LCR) to the NodeB. The above parameters include at least parameters for indicating wireless network temporary identifier, i.e., "BCCH Specific HS-DSCH RNTI Information LCR" and paging system information i.e., "HS-DSCH Paging System Information LCR" beared on the BCCH.

Step 203: a UE reads a system message and transmits a connection establishment request to the NodeB in the cell.

The fifth system information block (SIB5) in the system message includes a series of information assigned to the NodeB by the network controller in the step 2, the information at least includes "HS-DSCH common system information" and "HS-DSCH paging system information". The "HS-DSCH common system information" includes parameters such as "HS-SCCH system info", "Common H-RNTI Information", "BCCH specific H-RNTI" and the like.

The RRC connection establishment request transmitted by the UE includes a parameter "HS-PDSCH in CELL_FACH" indicating that the UE has the capability of transmitting the PCH beared on the highspeed physical channel. That is, the UE has a capability of receiving the PCH beared on the HS-DSCH.

After step 203, the UE enters a URA_PCH state and does not have specific H-RNTI. The UE in the CELL_PCH state differs from that in the URA_PCH state in that the UE does not have specific H-RNTI and there is no need to establish the HS-SCCH in subsequent steps but the PCH is directly transmitted on the High Speed-Physical Downlink Shared Channel (HS-PDSCH).

Step 204: the NodeB uses corresponding identifier to instruct one or more certain System Information Block (SIB) to be updated, and triggers transmitting of the PICH to instruct the UE to receive associated paging sub-frame.

Step 205: the UE starts receipt of the paging sub-frame associated with the PICH in N time intervals following receipt of the PICH.

That is, the UE detects the paging indicator on the PICH for instructing PCCH transmission, and then receives the HS-PDSCH sub-frame associated with the PICH.

Step 206: the UE receives the PCCH and determines that the system message needs to be updated.

Specifically, the UE receives the PCCH on corresponding HS-DSCH; the RRC message beared on the PCCH is "PAGING TYPE 1" and the RRC message includes "BCCH modification info" in which "MIB value tag" has changed.

Then, the UE starts receipt of the system message and can receive updated SIB.

Third Embodiment

This embodiment mainly relates that UE receives DCCH/Dedicated Traffic Channel (DTCH) on HS-DSCH under CELL_PCH state.

Figure 3:
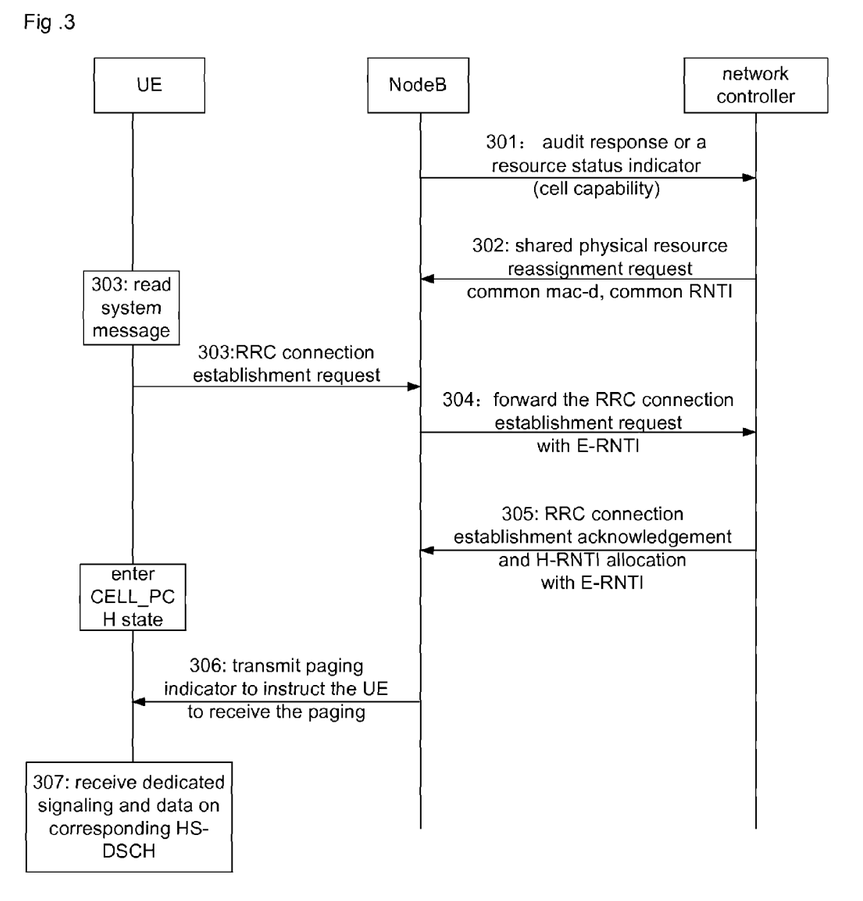
FIG. 3 is a flowchart of a method for transmitting traffic data over a paging channel according to a third embodiment of the disclosure.

FIG. 3 is a flowchart of a method for transmitting traffic data over a paging channel according to the third embodiment of the disclosure. As shown in FIG. 3, the method for transmitting traffic data over a paging channel according to this embodiment includes the following steps.

Step 301: a NodeB informs a network controller of a cell capability through an audit response or a resource status indicator.

Specifically, the resource audit response or the resource status indicator transmitted by the NodeB must include the following cell capacities, i.e., "Enhanced FACH Capability" and "Enhanced PCH Capability"; the above capabilities indicate that the NodeB has a capability of transmitting a high-data-rate PCH.

Step 302: the network controller assigns a common mac-d and a common RNTI to the NodeB through a shared physical resource reassignment request.

The physical resource reassignment request is an instruction transmitted from the network controller to the NodeB. In the instruction, the network controller assigns a series of parameters for the HS-DSCH (HS-DSCH Common System Information LCR) to the NodeB. The above parameters include at least parameters for indicating wireless network temporary identifier, i.e., "BCCH Specific HS-DSCH RNTI Information LCR" and paging system information i.e., "HS-DSCH Paging System Information LCR" beared on the BCCH.

Step 303: a UE reads a system message and transmits a connection establishment request to the NodeB in the cell.

The SIB5 of the system message includes a series of information assigned to the NodeB by the network controller in the step 2, the information at least includes "HS-DSCH common system information" and "HS-DSCH paging system information". The "HS-DSCH common system information" includes parameters such as "HS-SCCH system info", "Common H-RNTI Information", "BCCH specific H-RNTI" and the like.

The RRC connection establishment request sent by the UE includes a parameter "HS-PDSCH in CELL_FACH" indicating that the UE has a capability of transmitting the PCH beared on the highspeed physical channel. That is, the UE has a capability of receiving the PCH beared on the HS-DSCH.

Step 304: NodeB forwards the RRC connection establishment request to the network controller through a FP including E-RNTI which is assigned to UE by the NodeB.

Step 305: the network controller assigns corresponding H-RNTI to UE after receipt of the connection establishment request, and transmits a RRC connection acknowledgement to the NodeB through the FP frame, in which the FP frame includes H-RNTI and E-RNTI assigned to UE.

The NodeB transmits H-RNTI and E-RNTI assigned to UE and the RRC connection acknowledgement to UE.

UE enters CELL-PCH state after receipt of the RRC connection acknowledgement.

Step 306: the NodeB transmits a paging indicator on the PICH to the UE in a CELL_PCH state; the NodeB triggers transmitting of downlink specific signaling or data to the UE, the NodeB informs the UE through the HS-SCCH to receive the specific signaling or data.

The NodeB transmits a HS-SCCH order on a first HS-SCCH sub-frame associated with the PICH frame, and the UE is identified by the specific H-RNTI of the UE. The UE is randomly accessed in an E-DCH Random Access Uplink Control Channel (E-RUCCH) when the UE detects the synchronous HS-SCCH. The NodeB transmits HS-DSCH transmission blocks on corresponding HS-DSCH sub-frame when the uplink synchronization is detected.

Step 307: the UE receives the specific signaling or data on corresponding HS-DSCH after receipt of the HS-SCCH.

The UE receives DCCH/DTCH on corresponding HS-DSCH.

The disclosure also provides a system for transmitting traffic data over a paging channel, which includes a network side and a UE.

The network side is configured to determine that the UE has a capability of making a PCH beared on a highspeed physical channel; and to inform the UE of information of a traffic control information bearer channel through a paging indicator, when the UE is in a PCH state.

The UE is configured to listen for the traffic control information bearer channel, and to receive data on a traffic channel indicated by the traffic control information.

The traffic control information bearer channel is a HS-SCCH or a PCCH in which the PCCH is beared on a HS-PDSCH. The traffic channel is a BCCH. The BCCH is beared on the PCH. The PCH is beared on the HS-DSCH. The PCH state includes a CELL-PCH state or a URA_PCH state.

The UE may be configured, when in the CELL-PCH state, to listen for the HS-SCCH and perform synchronization according the PICH from the network side.

The network side may be configured to trigger the cell system information update through the HS-SCCH to instruct the UE to receive the BCCH on the HS-DSCH.

The UE may be configured to receive traffic data from the BCCH.

Or, the UE may be configured, when in the CELL-PCH state, to listen for the HS-SCCH and perform synchronization according the PICH from the network side.

The network side may be configured to trigger the cell system information update through the HS-SCCH to instruct the UE to receive the BCCH on the HS-DSCH.

The UE may be configured to receive traffic data from the BCCH.

It should be noted that the system for transmitting traffic data over a paging channel according to the disclosure mainly enhances function of a part of network elements and the UE in the conventional network architecture, and does not change the network architecture itself. For the above enhancement of function, the manner for processing corresponding messages performed by relevant network elements differs from the conventional manner. The above enhancement of function may be understood with reference to the description of the first, second and third embodiments.

Figure 4:
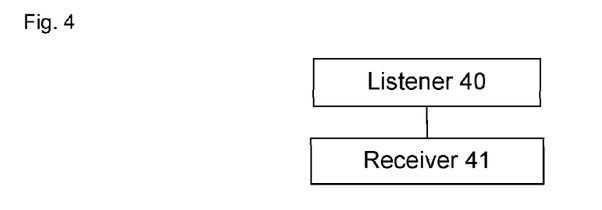
FIG. 4 is a structure diagram of a user equipment according to the disclosure.

FIG. 4 is a structure diagram of a user equipment according to the disclosure. As shown in FIG. 4, the UE according to the disclosure has a capability of transmitting a PCH beared on a highspeed physical channel and includes a listener 40 and a receiver 41.

The listener 40 is configured to listen for a traffic control information bearer channel when the UE is in a PCH state.

The receiver module 41 is configured to receive traffic data on a traffic channel indicated by the traffic control information.

The traffic control information bearer channel is a HS-SCCH or a PCCH in which the PCCH is beared on a HS-PDSCH. The traffic channel is a BCCH. The BCCH is beared on the PCH. The PCH is beared on the HS-DSCH. The PCH state includes a CELL-PCH state or a URA_PCH state.

For the specific function of the listening module 40 and the receiving module 41, please refer to the description of the first, second and third embodiments. The person skilled in the art should appreciate that the UE according to the disclosure not only can listen for the channel, but also can analyze data beared on the channel. The disclosure intends to allow the HS-DSCH to carry the PCH, so as to perform Always on service, therefore, description of other function of the UE including transmitting of data is omitted.

The mentioned above is only preferred embodiments of the disclosure but not limitation to the disclosure.

The invention claimed is:

1. A method for transmitting traffic data for Always-on service over a paging channel (PCH), comprising:
   transmitting, by user equipment (UE, a radio resource control (RRC) connection establishment request indicating that the UE has a capability of bearing the PCH on a highspeed physical channel, to a NodeB;
   forwarding, by the NodeB, the RRC connection establishment request with an Enhanced Dedicated Channel (E-DCH) Radio Network Temporary Identifier (E-RNTI) assigned to the UE to a network control network element;
   assigning, by the network control network element, a HS-DSCH Radio Network Transaction Identifier (H-RNTI) to the UE after receipt of the RRC connection establishment request;
   transmitting, by the network control network element, a RRC connection establishment acknowledgement with the E-RNTI and the H-RNTI to the NodeB;
   forwarding, by the NodeB, the RRC connection establishment acknowledgement with the E-RNTI and the H-RNTI, to the UE; and
   entering, by the UE, the CELL-PCH state;
   determining, by a network side, that the UE has a capability of transmitting the PCH beared on a High Speed-Physical Downlink Shared Channel (HS-PDSCH);
   informing, by the network side, the UE of information of a traffic control information bearer channel through a paging identifier, when the UE is in a CELL-PCH state;
   listening, by the UE, for the traffic control information bearer channel; and
   receiving, by the UE, the traffic data for Always-on service on the traffic channel indicated by the traffic control information,
   wherein, the listening, by the UE, for the traffic control information bearer channel, and receiving, by the UE, the traffic data for Always-on service on a traffic channel indicated by the traffic control information comprises:
   listening, by the UE, according to a Paging Indicator Channel (PICH) identifier from the network side, for a HS-SCCH to perform synchronization;
   triggering, by the network side, a cell system information update through the HS-SCCH;
   instructing, by the network side, the UE to receive a BCCH on a High Speed Downlink Shared Channel (HS-DSCH);
   receiving, by the UE, the traffic data for Always-on service from the BCCH;
   wherein, instructing, by the network side, the UE to receive the BCCH on the HS-DSCH comprises: a first HS-SCCH listed on an update message 'HS-SCCH system info' transmitted by the Node B uses a BCCH specific H-RNTI to instruct the UE to receive the BCCH on the HS-DSCH.

2. The method according to claim 1, wherein the traffic control information bearer channel is a High Speed Shared Control Channel (HS-SCCH) or a High Speed Shared Control Channel (PCCH), and the traffic channel is a Broadcast Control Channel (BCCH).

3. The method according to claim 2, wherein the BCCH is beared on the PCH, and the PCH is beared on a High Speed Downlink Shared Channel (HS-DSCH).

4. A method for transmitting traffic data for Always-on service over a paging channel (PCH), comprising:
   transmitting, by user equipment (UE), a radio resource control (RRC) connection establishment request indicating that the UE has a capability of bearing the PCH on a highspeed physical channel, to a NodeB;
   forwarding, by the NodeB, the RRC connection establishment request with an Enhanced Dedicated Channel (E-DCH) Radio Network Temporary Identifier (E-RNTI) assigned to the UE to a network control network element;
   assigning, by the network control network element, a HS-DSCH Radio Network Transaction Identifier (H-RNTI) to the UE after receipt of the RRC connection establishment request;
   transmitting, by the network control network element, a RRC connection establishment acknowledgement with the E-RNTI and the H-RNTI to the NodeB;
   forwarding, by the NodeB, the RRC connection establishment acknowledgement with the E-RNTI and the H-RNTI, to the UE; and
   entering, by the UE, the CELL-PCH state;
   determining, by a network side, that the UE has a capability of transmitting the PCH beared on a High Speed-Physical Downlink Shared Channel (HS-PDSCH);
   informing, by the network side, the UE of information of a traffic control information bearer channel through a paging identifier, when the UE is in a CELL-PCH state;
   listening, by the UE, for the traffic control information bearer channel; and
   receiving, by the UE, the traffic data for Always-on service on a traffic channel indicated by the traffic control information,
   wherein, the listening, by the UE, for the traffic control information bearer channel, and receiving, by the UE, the traffic data for Always-on service on the traffic channel indicated by the traffic control information comprises:

listening, by the UE, for a HS-SCCH according to a Paging Indicator Channel (PICH) identifier from the network side;

synchronizing, by the UE, itself with the HS-SCCH through a UE identifier in the HS-SCCH gotten during the listening;

transmitting, by the network side, the traffic data for Always-on service through the HS-DSCH when detecting up-link synchronization of the UE;

receiving, by the UE, the traffic data for Always-on service through the HS-DSCH;

wherein, receiving, by the UE, the traffic data for Always-on service through the HS-DSCH comprises: the UE receives specific signaling or data on corresponding HS-DSCH after receipt of the HS-SCCH, in which a HS-SCCH order for the HS-SCCH is transmitted by the Node B on a first HS-SCCH sub-frame associated with a PICH frame.

5. A method for transmitting traffic data for Always-on service over a paging channel (PCH), comprising:

transmitting, by user equipment (UE), a radio resource control (RRC) connection establishment request indicating that the UE has a capability of bearing the PCH on a highspeed physical channel, to a NodeB;

directly entering, by the UE, a UTRAN Registration Area paging channel (URA_PCH) state immediately after transmitting the RRC connection establishment request;

determining, by a network side, that the UE has a capability of the PCH beared on a High Speed-Physical Downlink Shared Channel (HS-PDSCH);

informing, by the network side, the UE of information of a traffic control information bearer channel through a paging identifier, when the UE is in the URA-PCH state;

listening, by the UE, for the traffic control information bearer channel; and receiving, by the UE, the traffic data for Always-on service on a traffic channel indicated by the traffic control information;

wherein, receiving, by the UE, the traffic data for Always-on service on a traffic channel indicated by the traffic control information comprises: the UE detects a paging indicator on a Paging Indicator Channel (PICH) for instructing PCCH transmission, and then receives an HS-PDSCH sub-frame associated with the PICH.

6. The method according to claim 5, wherein, the listening, by the UE, for the traffic control information bearer channel, and receiving, by the UE, the traffic data for Always-on service on the traffic channel indicated by the traffic control information comprises:

listening, by the UE, for a HS-SCCH according to a PICH identifier from the network side to perform synchronization;

triggering, by the network side, a cell system information update through the HS-SCCH;

instructing, by the network side, the UE to receive a BCCH on the HS-SCCH;

receiving, by the UE, the traffic data for Always-on service from the BCCH.

7. A system for transmitting traffic data for Always-on service over a paging channel, comprising:

a network side, configured to determine that a user equipment (UE) has a capability of transmitting a paging channel (PCH) beared on a High Speed-Physical Downlink Shared Channel (HS-PDSCH), and to inform the UE of information of a traffic control information bearer channel through a paging identifier when the UE is in a PCH state;

the UE, configured to listen for a traffic control information bearer channel and to receive the traffic data for Always-on service on a traffic channel indicated by the traffic control information, wherein when the UE is in a CELL-PCH state,
the UE listens according to a Paging Indicator Channel (PICH) identifier from the network side, for a HS-SCCH to perform synchronization, the network side triggers a cell system information update through the HS-SCCH, the network side instructs the UE to receive a BCCH on the HS-DSCH, and the UE receives the traffic data for Always-on service from the BCCH, wherein, the network side instructs the UE to receive a BCCH on an HS-DSCH comprises: a first HS-SCCH listed on a update message 'HS-SCCH system info' transmitted by the Node B uses a BCCH specific H-RNTI to instruct the UE to receive the BCCH on the HS-DSCH; or the UE listens for a HS-SCCH according to a PICH identifier from the network side, synchronize itself with the HS-SCCH through a UE identifier in the HS-SCCH gotten during the listening, the network side transmits the traffic data for Always-on service through the HS-DSCH when detecting up-link synchronization of the UE, and the UE receives the traffic data for Always-on service through the HS-DSCH, wherein, the UE receives the traffic data for Always-on service through the HS-DSCH comprises: the UE receives specific signaling or data on corresponding HS-DSCH after receipt of the HS-SCCH, in which a HS-SCCH order is transmitted by the Node B on a first HS-SCCH sub-frame associated with a PICH frame; or wherein the UE transmits a radio resource control (RRC) connection establishment request indicating that the UE has a capability of bearing the PCH on a highspeed physical channel, to a NodeB and directly enters a UTRAN Registration Area paging channel (URA_PCH) state immediately after transmitting the RRC connection establishment request; wherein, the UE in the UTR_PCH state receives the traffic data for Always-on service on a traffic channel indicated by the traffic control information comprises: the UE detects a paging indicator on a Paging Indicator Channel (PICH) for instructing PCCH transmission, and then receives an HS-PDSCH sub-frame associated with the PICH.

8. The system according to claim 7, wherein, the traffic control information bearer channel is a High Speed Shared Control Channel (HS-SCCH) or a High Speed Shared Control Channel (PCCH), and the traffic channel is a Broadcast Control Channel (BCCH), and wherein the BCCH is beared on the PCH and the PCH is beared on a High Speed Downlink Shared Channel (HS-DSCH).

9. The system according to claim 7, wherein, the PCH state comprises a CELL-PCH state or a UTRAN Registration Area paging channel (URA_PCH) state.

10. The system according to claim 9, wherein, when the UE is in the CELL-PCH state, the UE is further configured to listen for a HS-SCCH to perform synchronization according to a Paging Indicator Channel (PICH) identifier from the network side;

the network side is further configured to trigger a cell system information update through the HS-SCCH, and to instruct the UE to receive a BCCH on the HS-DSCH;

the UE is further configured to receive the traffic data for Always-on service from the BCCH.

11. A user equipment (UE) having a capability of transmitting a paging channel (PCH) beared on a High Speed-Physical Downlink Shared Channel (HS-PDSCH), comprising:
a listener, configured to listen for a traffic control information bearer channel when the UE is in a PCH state;
a receiver, configured to receive traffic data for Always-on service on a traffic channel indicated by the traffic control information,
wherein the UE listens according to a Paging Indicator Channel (PICH) identifier from the network side, for a HS-SCCH to perform synchronization, receives a BCCH on the HS-DSCH, and receives the traffic data for Always-on service from the BCCH, wherein, the UE receives a BCCH on an HS-DSCH comprises: a first HS-SCCH listed on a update message 'HS-SCCH system info' transmitted by the Node B uses a BCCH specific H-RNTI to instruct the UE to receive the BCCH on the HS-DSCH; or
wherein the UE listens for a HS-SCCH according to a PICH identifier from the network side, synchronize itself with the HS-SCCH through a UE identifier in the HS-SCCH gotten during the listening, the network side transmits the traffic data for Always-on service through the HS-DSCH when detecting up-link synchronization of the UE, and receives the traffic data for Always-on service through the HS-DSCH, wherein, the UE receives the traffic data for Always-on service through the HS-DSCH comprises: the UE receives specific signaling or data on corresponding HS-DSCH after receipt of the HS-SCCH, in which a HS-SCCH order is transmitted by the Node B on a first HS-SCCH sub-frame associated with a PICH frame; or
wherein the UE transmits a radio resource control (RRC) connection establishment request indicating that the UE has a capability of bearing the PCH on a highspeed physical channel, to a NodeB and directly enters a UTRAN Registration Area paging channel (URA_PCH) state immediately after transmitting the RRC connection establishment request, wherein, the UE in the UTR PCH state receives the traffic data for Always-on service on a traffic channel indicated by the traffic control information comprises: the UE detects a paging indicator on a Paging Indicator Channel (PICH) for instructing PCCH transmission, and then receives an HS-PDSCH sub-frame associated with the PICH.

12. The UE according to claim 11, wherein the traffic control information bearer channel is a High Speed Shared Control Channel (HS-SCCH) or a High Speed Shared Control Channel (PCCH), and the traffic channel is a Broadcast Control Channel (BCCH), and
wherein the BCCH is beared on the PCH and the PCH is beared on a High Speed Downlink Shared Channel (HS-DSCH).

13. The UE according to claim 11, wherein the PCH state comprises: a CELL-PCH state or a UTRAN Registration Area paging channel (URA_PCH) state.

* * * * *

UNITED STATES PATENT AND TRADEMARK OFFICE
CERTIFICATE OF CORRECTION

PATENT NO. : 9,548,841 B2
APPLICATION NO. : 14/119674
DATED : January 17, 2017
INVENTOR(S) : Yun Zhu and Chun Huang Page 1 of 1

It is certified that error appears in the above-identified patent and that said Letters Patent is hereby corrected as shown below:

On the Title Page

Attorney, Agent or Firm Should Read: Oppedahl Patent Law Firm LLC

Signed and Sealed this
Nineteenth Day of May, 2020

Andrei Iancu
*Director of the United States Patent and Trademark Office*